United States Patent [19]

Edstrom et al.

[11] Patent Number: 5,233,533
[45] Date of Patent: Aug. 3, 1993

[54] SCHEDULING METHOD AND APPARATUS

[75] Inventors: Nils O. Edstrom, Dover; Stewart A. Davis, Andover; George B. Bennett, Brookline; Ronald V. Simmons, Arlington; John B. Neal, Charlestown; John P. Long, Tewksbury; Tom R. Kibler, Groton; Daniel R. Ries, Belmont, all of Mass.

[73] Assignee: Symmetrix, Inc., Burlington, Mass.

[21] Appl. No.: 452,811

[22] Filed: Dec. 19, 1989

[51] Int. Cl.⁵ .................... G06F 15/46; G06F 15/22
[52] U.S. Cl. ................................. 364/468; 364/401
[58] Field of Search ............ 364/468, 401, 149, 402, 364/403

[56] References Cited

U.S. PATENT DOCUMENTS

| | | | |
|---|---|---|---|
| 4,383,298 | 5/1983 | Huff et al. | 364/401 |
| 4,646,229 | 2/1987 | Boyle | 395/600 |
| 4,646,238 | 2/1987 | Carlson, Jr. et al. | 364/403 |
| 4,648,023 | 3/1987 | Powell | 364/156 |
| 4,796,194 | 1/1989 | Atherton | 364/468 |
| 4,807,108 | 2/1989 | Ben-Arieh et al. | 364/468 |
| 4,852,001 | 7/1989 | Tsushima et al. | 364/401 |
| 4,866,628 | 9/1989 | Natarajan | 364/468 |
| 4,887,218 | 12/1989 | Natarajan | 364/468 |
| 4,896,269 | 1/1990 | Tong | 364/468 |
| 4,937,743 | 6/1990 | Rassman et al. | 364/401 |
| 5,040,123 | 8/1991 | Barber et al. | 364/468 |

OTHER PUBLICATIONS

"Production Management Concept Cuts Delays, Budget Overruns" by Jay C. Lowndes, in *Aviation Week and Space Technology*, vol. 122, No. 19, pp. 85-87, May 13, 1985.
"The Goal" by Eliyahu M. Goldratt and Jeff Cox, North River Press, Inc., 1984, 1986 Revised Edition, pp. 201-242.
"The Race" by Eliyahu M. Goldratt and Robert E. Fox, North River Press, Inc., 1986, pp. 10, 28-29, 36-37, 66-71, 88-116 and 167-177.
"A Comparative Analysis of Master Production Scheduling Techniques for Assemble-To-Order Products" by William J. Tallon, *Decision Sciences*, vol. 20, 1989, pp. 492-506.
"The Shifting Bottleneck Procedure for Job Shop Scheduling" by J. Adams, E. Balas and D. Zawach, *Management Science*, vol. 34, No. 3, Mar. 1988, pp. 391-401.
"Lot Sizes, Lead Times and In-Process Inventories", by Uday S. Karmarkar, *Management Science*, vol. 33, No. 3, Mar. 1987, pp. 409-423.
"A Mathematical Programming Approach to a Deterministic Kanban System", by Gabriel R. Bitran and Li Chang, *Management Science*, vol. 33, No. 4, Apr. 1987, pp. 427-441.

*Primary Examiner*—Jerry Smith
*Assistant Examiner*—Paul Gordon
*Attorney, Agent, or Firm*—Hamilton, Brook, Smith & Reynolds

[57] ABSTRACT

Scheduling software provides date and time allocation of resources to a sequence of processes for manufacturing a desired item. Scheduling is performed by a backward-forward method and alternatively by an backward-jump forward method to meet a requested due date. Resources are dynamically allocated to satisfy processes according to pre-established rules for allocation. Also resources are allocated in certain amounts or in a predetermined pattern to minimize waste or left over amounts of the resource. To allocate certain resources, purchase or production of the resource is scheduled first.

15 Claims, 17 Drawing Sheets

| 12/1/89 | Product List | 10:03 |

| Prod No | Site Desc | Prod Code | Make Buy (R/I/X/F) | Prod Int | Theo Cycle Time (hrs) | Demand Fence (days) | POQ (days) | Min Batch Size (grms) | Max Batch Size (grms) | Incr Batch Size (grms) | Buyer/Planner |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

⟨F3⟩ Edit
⟨F4⟩ Insert    ⟨F10⟩ Product Routings....
⟨F5⟩ Delete

| 11/28/89 | Product Routing | | | | | 15:02 |
|---|---|---|---|---|---|---|
| Product Number_____ | | | Product Site:_____ | | | |
| Work Center | Process ID | Site Type | Sequence Group | Next | Start Number | Window (in hrs) |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |

⟨F3⟩ Edit Y  ⟨F6⟩ Sort M  ⟨F10⟩ Resource Requirents
⟨F4⟩ Insert Y  ⟨F7⟩ Search Y
⟨F5⟩ Delete Y  ⟨F8⟩ Select Y

```
12/1/89         Workstation List                    10:03

Size/
    Site   Units        Size/
ID  Desc   (S/R)   Size  Load  #slots    Pre    Uncon

|  |   |   |   |   |   |   |   |   |   |   |   |
    |  |   |   |   |   |   |   |   |   |   |   |   |
    |  |   |   |   |   |   |   |   |   |   |   |   |
    |  |   |   |   |   |   |   |   |   |   |   |   |
    |  |   |   |   |   |   |   |   |   |   |   |   |
    |  |   |   |   |   |   |   |   |   |   |   |   |
    |  |   |   |   |   |   |   |   |   |   |   |   |

<F10>
<F3> Edit
<F4> Insert
<F5> Delete
```

| 11/28/89 | Workstation Calendar Information | 15:02 |

Type: _____
Site: _____

Time Avail

Week Days Shift 1: _____
          Shift 2: _____
          Shift 3: _____

Week Ends Shift 1: _____
          Shift 2: _____
          Shift 3: _____

<F3> Edit
<F4> Insert                                    <F10>

| 11/28/89 | Staff Pool List | 15:02 |
|---|---|---|
| Staff Pool ID | Site | Description |

⟨F3⟩ Edit  ⟨F6⟩ Sort  ⟨F9⟩ View Staff Pool Plan
⟨F4⟩ Insert  ⟨F7⟩ Search  ⟨F10⟩ View Calendar for Staff Pool
⟨F5⟩ Delete  ⟨F8⟩ Select

| 11/28/89 | Staff Pool Preference Assignment | 15:02 |
|---|---|---|

Work Station Type: _____
Capacity Code: _____

Site: _____

Preference Number

| | | | | | | | |

<F3> Edit     <F6> Sort     <F9> View WS Plan
<F4> Insert    <F7> Search   <F10> View Staff Pool Use
<F5> Delete   <F8> Select

| 11/28/89 | Work Station Staff Pool Usage | 15:02 |

Work Station Type: _____  Site: _____
Capacity Code: _____  Preference Number: _____

| Staff Pool Name | Setup Time (hours) | Run Time (% of WS) | Clear Time (hours) | Attnd End | Between Intervals (Hrs.) | Length of Interval (Hrs.) |
|---|---|---|---|---|---|---|
| | | | | | | |

<F3> Edit    <F6> Sort     <F9> View WS Plan
<F4> Insert  <F7> Search   <F10> View Calendar for Staff Pool
<F5> Delete  <F8> Select

| 11/28/89 | Staff Pool Calendar Information | 15:02 |
|---|---|---|

Staff Pool Type: _____
Site: _____

Num of
Man-Hours Avail

Week Days Shift 1: _____
Shift 2: _____
Shift 3: _____

Week Ends Shift 1: _____
Shift 2: _____
Shift 3: _____

<F3> Edit
<F9> View Staff Pool Plan
<F10> View Capacity Exceptions

| 11/28/89 | Materials | 15:02 |
|---|---|---|
| Product Number | Site | Inventory Level |

⟨F6⟩ Sort        ⟨F9⟩ View Material Plan
⟨F7⟩ Search   ⟨F10⟩ Lot QA/Qtys
⟨F8⟩ Select   ⟨F11⟩ Detailed Qtys

| 11/28/89 | Safety Stock | | 15:02 |
|---|---|---|---|

Schedule Site: _____

| Product Number | Site | Date | Quantity |
|---|---|---|---|
| _____ | _____ | _____ | _____ |
| _____ | _____ | _____ | _____ |
| _____ | _____ | _____ | _____ |
| _____ | _____ | _____ | _____ |
| _____ | _____ | _____ | _____ |
| _____ | _____ | _____ | _____ |
| _____ | _____ | _____ | _____ |
| _____ | _____ | _____ | _____ |
| _____ | _____ | _____ | _____ |
| _____ | _____ | _____ | _____ |

⟨F4⟩ Change Shedule Site     ⟨F5⟩ Add/Edit Line
                                         ⟨sF5⟩ Delete Line

| 11/28/89 | Resource Capacity Exceptions | 15:02 |

Resource ID: _____    Resource Site: _____

From Date        To Date        Exception Quantity y ⟨F3⟩ Edit    y ⟨F4⟩ Insert    ⟨F9⟩ View Resource Plan

| 11/28/89 | | | Orders | | | | 15:02 |
|---|---|---|---|---|---|---|---|
| Order | Product | Site | Type | Pkg Qty | ReqComp Date | Begin Date | End Date |
| | | | | | | | |
| | | | | | | | |
| | | | | | | | |
| | | | | | | | |
| | | | | | | | |
| | | | | | | | |
| | | | | | | | |
| | | | | | | | |

⟨F3⟩ Edit    ⟨F6⟩ Sort    ⟨F9⟩ Order Info    ⟨F12⟩ Allocate CO Line
⟨F4⟩ Insert  ⟨F7⟩ Search  ⟨F10⟩ Order Process ⟨F13⟩ Ship CO Line
⟨F5⟩ Delete  ⟨F8⟩ Select  ⟨F11⟩ Order Plan    ⟨F14⟩ Receive/Put Material

SCHEDULING METHOD AND APPARATUS

BACKGROUND OF THE INVENTION

In the manufacturing or factory setting, customer orders for various items need to be processed in a certain amount of time (i.e. by a shipment date). For each item ordered which is not already in inventory, the item must be manufactured. To manufacture the item, certain resources (materials, machine time, man hours, etc.) used in a predetermined sequence of events are required. In order to efficiently utilize the resources of the manufacturing plant in such manufacturing of items, and ultimately in fulfilling a multiplicity of orders, the manufacturer generally employs a device for scheduling the use of different resources at different dates and time.

Various scheduling methods exist to aid in and/or optimize such scheduling of resources. Typically, scheduling methods are based on one of two scheduling techniques, forward scheduling or backward scheduling. Briefly, in forward scheduling the sequence of desired manufacturing steps is scheduled beginning at the current date and from then into the future. The capacity of resources influences how far into the future steps are scheduled. Backward scheduling schedules the sequence of manufacturing steps in reverse order from the shipment date backward in time toward the current date without regard to the capacity of the resources required.

Other scheduling methods concern the planning of materials required in the manufacturing process. Scheduling devices which employ these scheduling methods are generally referred to as materials requirement planning (MRP) systems. Typically, MRP scheduling systems assume an infinite capacity of machinery, man hours, etc. and determines the amounts and types of materials that must be on hand at particular dates/times for a given manufacturing plant with given orders.

"Production Management Concept Cuts Delay, Budget Overruns" by J. C. Lowndes, *Aviation Week and Space Technology*, Volume 122, No. 19, Pages 85-87, May 13, 1985 discloses a scheduling software device called Opt (Optimized Production Technology). The Opt software combines capacity planning with forward scheduling and backward scheduling for "unconstrained" or infinite capacity resources. The core Opt module is a finite forward scheduler that uses resource capacity, orders and inventory data for optimum output from the resources. The core Opt module determines the hour and minute of each day at which bottlenecks or constrained processes will occur, and provides an indication of which due dates will be missed and by how much time the dates will be missed with the current plant configuration. A backward scheduling module of Opt assumes infinite capacity and schedules non-bottleneck processes beginning at the completion times determined by the core module. This ensures that material is available for the first operation in the critical part of the manufacturing process.

SUMMARY OF THE INVENTION

In accordance with the present invention a scheduling apparatus and method is provided which is based on finite forward and backward scheduling and which takes into consideration the capacity of resources. Dynamic selection of resources during routing of manufacturing processes is provided to minimize waste material. Also a scheduling apparatus and method is provided which calculates when materials are going to be needed and, hence, in what amount a manufacturer should buy materials.

Specifically, the present invention provides a scheduling software device with a supporting software program which employs a combination of backward and forward scheduling methods to schedule the sequence of events required to manufacture an item. In a sequence of events, A, B, C which must be performed by a target due date, the software program starts at the due date and looks backward in time for available required resources to accomplish event C. Once a resource with the needed availability is found for event C over a range of dates prior to the due date, the software program allocates the resource to event C for the necessary time period out of the range of dates. From the earliest allocated date backward in time, the software program schedules a resource to accomplish event B and so on such that events A, B and C are serially scheduled. If the necessary time to accomplish an event, (say, for example, event A) is longer than the time between the earliest allocated day of a succeeding event (event B) and the present date, then the software program unschedules the previously allocated (backward scheduled) days and forward schedules resources from the present date into the future for events A-C. The forward scheduling also takes into account the capacity of the resources. The foregoing method is referred to as backward/forward scheduling.

Alternatively, the software program may use a backward/jump forward scheduling method. In such a method, the software program initially backward schedules as described above. When the backward scheduling produces a shortage of time in which to schedule after the present date, the software program calculates the amount of extra time needed beyond the present date and reschedules the target due date into the future by the calculated amount of extra time. The software program then backward schedules from the rescheduled due date. This is repeated until a schedule is produced.

In either of the foregoing scheduling methods, the software program takes into account the capacity of each machine and staffing pool of the plant. To that end, each manufacturing resource is assigned a manageable amount of work and is not overloaded or undersupplied with assignments. In a like manner, the inventory of materials is tracked and maintained.

Also, the software program determines the availability of a first needed resource in the sequence of manufacturing events. Say, for example, cutting is the first event required to manufacture an item and the slower of two cutting machines in the factory is chosen because the first cutting machine already has a maximum number of assignments. Then, based on the capacity (speed) of the chosen resource (the slower cutting machine), the software program calculates the total cutting time and reschedules the next required resource in the sequence of manufacturing events. Had the faster cutting machine been available for the first event, then the resource for the second event would be determined and scheduled for an earlier date. Thus, the software program dynamically selects resources to manufacture the item.

Also, the software program assigns machine time in a manner which first minimizes waiting time of items to be machined and then in a manner that increases use of the machine (i.e. decreases waste or leftover machine time). For example, in a baking step of the factory process, it is ideal to place a maximum amount of items in an oven each time the oven is used.

In accordance with another feature of the invention, the software program assigns materials for manufacturing an item in a manner which minimizes waste (i.e. leftover or scrap material). For instance, different shaped pieces of an item may have an arrangement for cutting which is optimal. The software program determines an optimal arrangement for a given item or set of items.

After sequences of events to manufacture items have been scheduled with available resources, the software program has a "calendar" from which to determine the usage of materials/resources. That is, the software program is able to calculate when certain amounts of materials are going to be needed and hence the date when the manufacturer needs to purchase materials, refills, etc. This feature relates to what is known as materials planning but is integrated with scheduling in the present invention.

In summary, the software program enables day-to-day operations of a business to be time, space and resource efficient.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 1b–1e are block diagrams of memory areas in the system of FIG. 1a.

FIG. 2a is a schematic illustration of a product list screen view in the system of FIG. 1a.

FIG. 2b is a schematic illustration of a product routing screen view in the system of FIG. 1a.

FIG. 3a–3i are schematic illustrations of screen views for defining resources in the system of FIG. 1a.

FIG. 4 is a schematic illustration of a screen view for entering orders of items to be manufactured in the system of FIG. 1a.

FIG. 5 is a flow diagram of a program supporting the system of FIG. 1a.

DETAILED DESCRIPTION OF THE PREFERRED EMBODIMENT

Figure 1A:
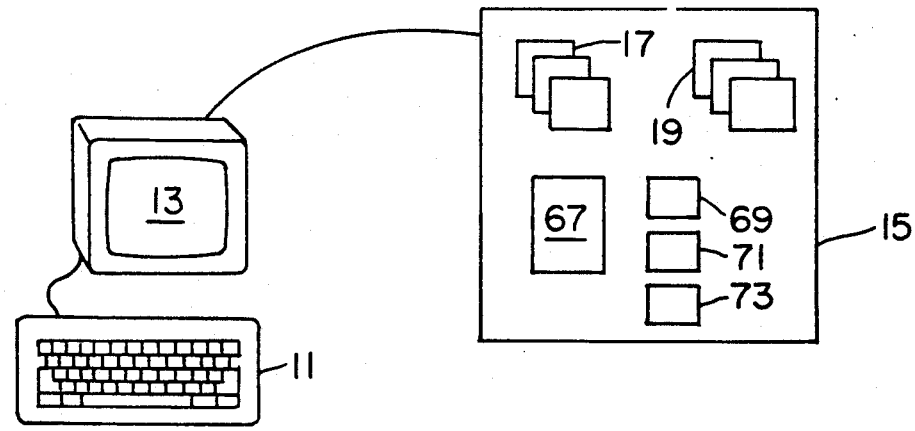
FIG. 1a is a schematic diagram of a computer system embodying the present invention.

By way of illustration and not limitation, FIG. 1a illustrates a computer workstation which embodies the present invention. It is understood that the workstation may be of an independent configuration or one of a plurality of workstations in a network. The workstation includes a digital processor 15, an input member 11, and a display unit 13. The digital processor 15 is preferably a single task minicomputer or a computer of the PC type. However, it is understood that a multiprocessor/macrocomputer may be employed.

The keyboard 11 and display unit 13 are coupled as I/O (input/output) devices to the digital processor 15 by means common in the art. That is, the keyboard 11 and/or a mouse (not shown) and the like are coupled to the processor 15 to provide the user a means for inputting data and commands to the digital processor 15. Display unit 13 is coupled to digital processor 15 to exhibit output of the digital processor. In addition, a printer (not shown) may be coupled to the workstation in a manner common in the art to provide hard copies of processor output.

The present invention software program resides in memory of the digital processor 15 and operates as follows. An outline of the invention software program is provided in FIG. 5.

A pre-established memory area 19 holds general descriptions of the user's resources for example, machines, materials and staff pool in a manufacturing plant or throughout a plurality of associated plants. Descriptions of resources throughout a plurality of manufacturing plants enables integrated planning of multiple plants. The general descriptions serve as templates to model the resources of the user.

Another pre-established memory area 17 holds general descriptions or templates of the different items that can be formed with the resources. Each template of an item provides the sequence of steps (machine processes and materials) required to manufacture the item.

An order file 67 in memory of digital processor 15 holds user specified demands (orders) for the different items that are to be manufactured by the user and, hence, scheduled by the invention software program. Each demand/order for an item includes desired quantity thereof and a due date by which the item is to be completed. In the manufacturing application of the present invention software, the orders in order file 67 are arranged according to types of demands including: customer orders, orders from another plant, manufacturing forecast orders, and safety stock replenishment orders to maintain inventory at a predefined threshold.

Through keyboard input, a user enters a start-up command which includes an indication of the demand/orders in order file 67 desired to be scheduled at this time and a first day from which to schedule or a range of days over which scheduling is desired. In turn, the depressed keys of the keyboard 11 generate signals to digital processor 15 to run (execute) the main procedure 89 (FIG. 5) of the present invention software. For each demand/order, the main procedure 89 matches the item requested in the demand and modeled by one of the templates of memory area 17 to available resources as modeled by the templates of memory area 19. This matching schedules the sequence of manufacturing steps of the requested item within the specified range of days (or at least for days after the user specified first day from which to schedule).

The main procedure 89 schedules manufacturing steps of an item with respect to capacity of the resources required where manufacturing steps which have been scheduled for previously requested items use the same resources. Overall capacity of a resource is defined in memory area 19 and availability on any given date/time of a resource is indicated in allocation blocks 69, 71, 73 (FIG. 1a). Hence, the present invention software program provides a finite capacity scheduler.

Also, the main procedure schedules manufacturing steps of a requested item according to the two following rules:

1) start processes (manufacturing steps) as late as possible to meet the due date; and 2) once the manufacturing steps of an item have been started, finish the steps as fast as possible.

Upon completion of the main procedure, display unit 13 displays various information regarding the manufacturing of the requested item. In particular, for each requested item of a user specified demand, the display unit 13 provides an indication of a start date on which the manufacturing steps are to be initiated and an end date on which the manufacturing steps will be completed. Along with the start date and end date, the display unit 13 exhibits a list of each process (manufacturing step) scheduled for manufacturing the item. The list of processes include quantity of materials and a start time and end time of use of resources (materials, machines) for each process.

From the foregoing output manufacturing information, other reports may be provided. For example, an indication of a date to order to raw materials and quantity thereof may be calculated and displayed as pertinent. Also, resource utilization reports may be formulated based on the amount of time that machines and staff pool are scheduled for use compared to the total amount of time in which these resources are available for use. Also, inventory levels of materials may be tracked over desired periods of time.

Accordingly the software program may be run each day to determine work scheduled for that day or the next day, and for a determination of materials that need to be ordered. To that end, a plurality of demands may be scheduled through the software program as desired by the user, for example, as new orders are obtained, or as a week's worth (or other time unit) of orders are obtained, or as certain orders are completed and other orders begun, etc.

The memory area 17 holding the descriptions of possible items is predefined through two screen views 21, 23 illustrated in FIGS. 2a and 2b respectively. Upon user command (i.e. by menu selection or operation of a function key or the like), digital processor 15 displays product list screen view 21 on display unit 13. The product list screen view 21 provides fields for the user to insert pertinent information to describe and specify an item (product). Through keyboard 11, the user provides the pertinent information in the respective fields of the screen view 21 while it is displayed on display unit 13.

In particular, for each desired item the user specifies a product number in the "product number" field. The user provides an indication of the plant which inventories this item in the "site" field of screen view 21. The user provides a description of the product in the indicated "Prod Desc" field of screen view 21. This description is stored as a text string in a product parameter file 25 (FIG. 1b) described later. One of the characters R, I, X, F is inserted by the user in the "product code" field to indicate the item type. The code R indicates a raw material; the code I indicates intermediate products/items. The code X indicates items which are used to find other forecasted items, and the code F indicates forecasted items that are not of type X. In the next field, the user enters an indication of M to indicate that the item is to be made, a B to indicate that the item is to be bought, or I to indicate that the item is to be obtained through an interplant transfer. In the "Theo Cycle Time" field, the user program indicates a theoretical manufacturing cycle time for the item. A procedure of the invention software program calculates the theoretical cycle time according to a sum of the elapsed time for all of the manufacturing processes of the item when all resources are available.

The "demand fence" field of screen view 21 is used for finished products, that is for items product codes of X or F. In cases of that type of product, the user enters into this field the number of calendar days for which the item is to be produced. The "P O Q" field is the order quantity period in calendar days. The user completes this field only in the case where the item is of type X or F. The next two fields "minimum batch size" and "maximum batch size" are completed by the user with integer values that represent the minimum allowable batch size and maximum allowable batch size. The maximum batch size must be equal to or greater than the minimal batch size. The "incr batch size" field is completed by the user with an integer value that represents the allowable increment to batch size. The last field "buyer/planner" of screen view 21 provides an area for the user to identify himself, for example, with initials or an ID code.

The keys of the keyboard 11 operated during input of the foregoing item specifications generate signals indicative of the data inputted by the user. In response to the generated signals, the program of the present invention sets values in a product parameter file 25 (FIG. 1b) according to the input item information/specifications. A different record 25a . . . 25n in the product parameter file 25 is generated for each product/item specified by the user through the product list screen view 21.

Figure 1B:
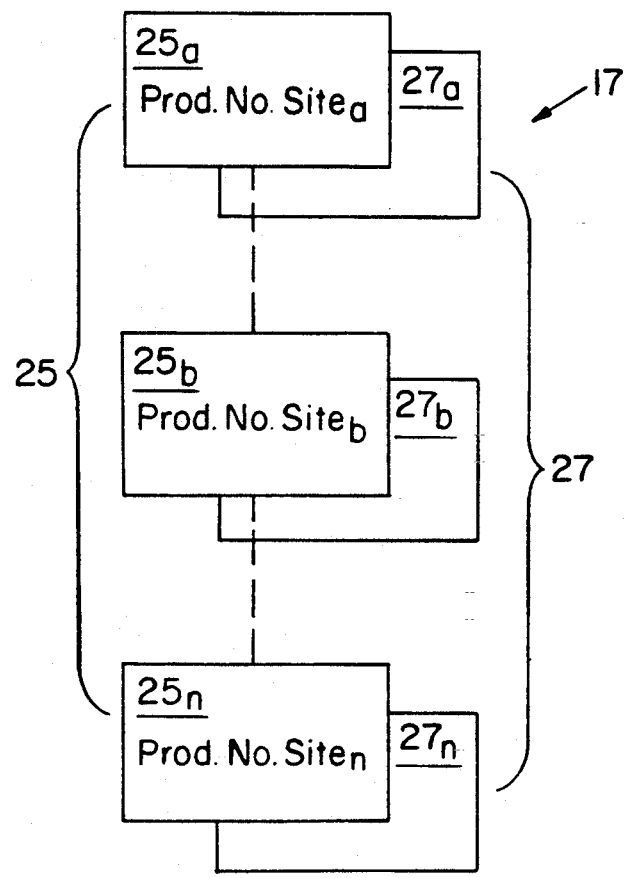

From screen view 21, the user operates function key 10 to continue predefining memory area 17. Upon operation of function key 10, digital processor 15 displays the product routing screen view 23 (FIG. 2b) on display unit 13. For each product.site (combination of product number and site from the product parameter file 25), there is a record in the product routing file 27 (FIG. 1b). The product routing screen view 23 is completed for each item/product (by product number/site combination) of the product list screen view 21 completed by the user. In the product routing screen view 23 of a product.site (product number and site combination from screen view 21), there is a "work center" field in which the user specifies an identifier. The identifier helps to categorize the manufacturing processes of the product. The identifier is used for reporting purposes only.

In the "Process ID Site Type" field of screen view 23, the user identifies the type of process to be used to manufacture the item. In the "sequence group" field, the user indicates the process group within the identified process type and a sequence number to indicate the order in which this process is to occur relative to the other listed processes in screen view 23. Also, the main procedure of the invention program schedules at an earlier date and time a process of a sequence with a number which precedes that of the other listed processes.

A process ID is formed by the concatination of the process type and resource group. The digital processor 15 displays the process ID in the "Process ID Site Type" field of screen view 23. The user also indicates "in field "Process ID Site Type" the site (plant) associated with the process.

In the field "next start" of screen view 23, the user indicates in a desired unit of time, the maximum delay before the next process must occur.

Upon completion of screen view 23 one record 27a, 27b . . 27n in the product routing file 27 (FIG. 1b) is formed from the inputted information. Thus, the routing file 27 specifies for each item of product parameter file 25, the sequence of generic processes for manufacturing the item.

The memory area 19 (FIG. 1a) holding the descriptions of resources is predefined through a series of screen views illustrated in FIGS. 3a–3i described next.

Illustrated in FIG. 3a is a workstation list screen view 29 which processor 15 displays on display unit 13 during user specification of the machines which are resources to the manufacturer. In field "ID", the user enters the workstation or machine type. In the "site" field, the user enters the plant site for the machine or workstation indicated in the corresponding "ID" field. In the "description" field, the user enters a brief description of the indicated workstation/machine.

In the "units" code field of screen view 29, the user enters a character (e.g. S or R) to indicate whether the capacity for this machine is measured in slots (S) or slots per hour (R). This field allows the modelling of machines whose capacity depends on batch size as measured by number of elements in a batch (e.g. ten pizza pans) or a number per unit of time (e.g. five yards per hour).

In the "size" field of screen view 29, the user enters the number of elements according to size of elements which are able to be processed as a slot or batch. For example, if the machine being modelled by screen view 29 is a pizza oven and the slots are shelves in the oven, then the "size" field indicates the number of large pizza pans that can fit on one shelf and, in the alternative, the number of small pizza pans that can fit on the shelf.

In the "size/load" field of screen view 29, the user enters an indication of how many items per slot define a load. In the "number of slots" field, the user enters the number of slots (e.g. number of oven shelves) in a workstation/machine of this type where each slot is of the size indicated in the corresponding "size" field.

A field "pre-allocation count" in screen view 29 serves as a flag for the user to indicate if the main procedure is to schedule machine time in equal increments such that remaining unscheduled amounts of time are of usable length. To accomplish this, the main procedure divides the total working time of the machine into equal increments or time windows according to the typical run time utilized by the machine as calculated by the present invention. Thus, the "pre-allocation count field" enables the present invention to minimize waste or leftover machine time. The field "unconstrained resource" provides a flag for the user to indicate that the workstation is unconstrained i.e. always available without limitations.

Figure 1C:
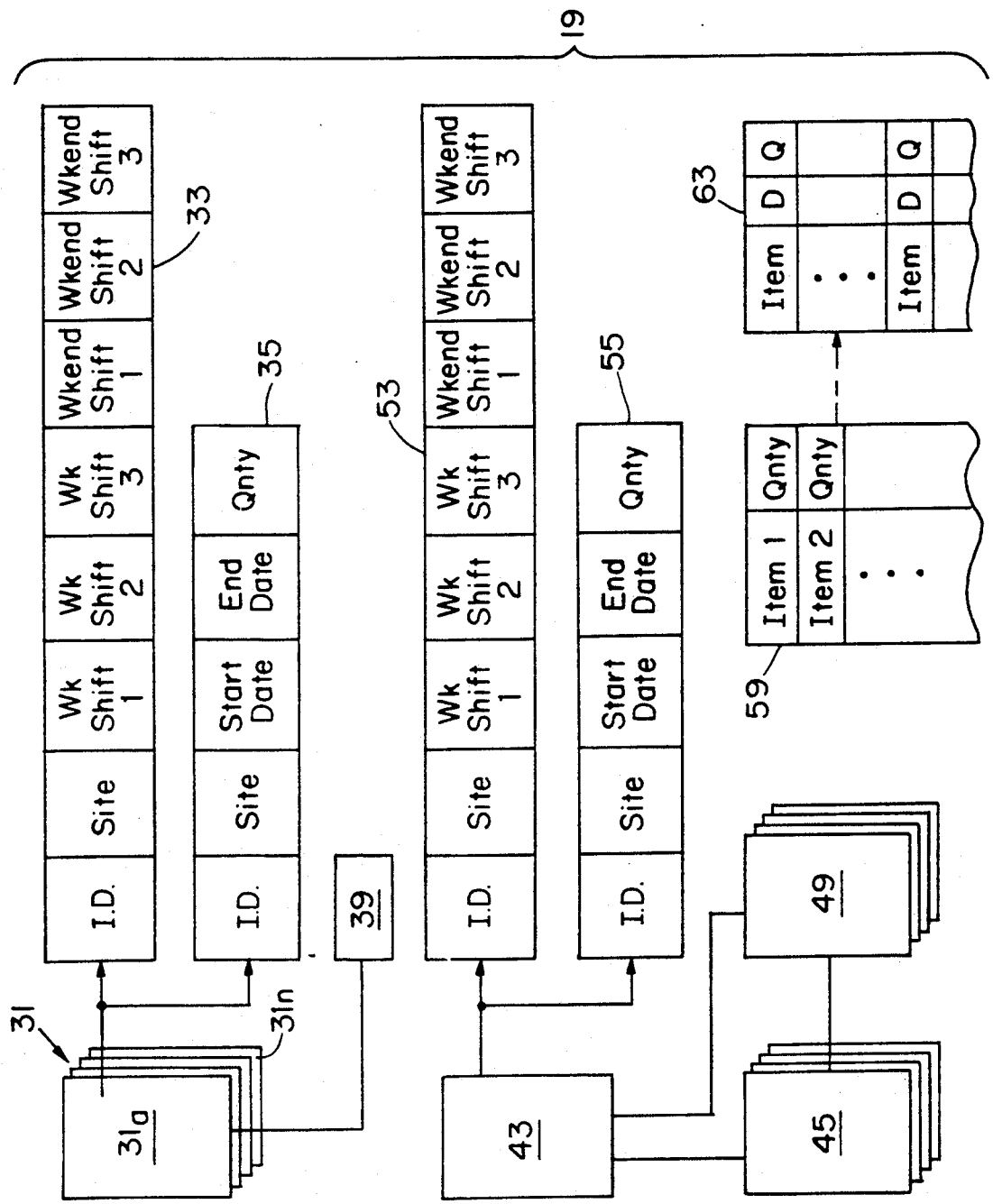

With the data input by the user onto screen view 29, digital processor 15 establishes a workstation parameter file 31 illustrated in FIG. 1c. For each machine listed by the user in the workstation screen view 29, there is a record 31a ... 31n in the workstation parameter file 31 (FIG. 1c). Each record contains specifications of a respective machine according to the information entered by the user on screen view 29. Associated with each record is a calendar file 33 and a calendar exception file 35.

Calendar file 33 as illustrated in FIG. 1c is accessed by workstation ID and site from a corresponding record 31a ... 31n which is reflected in the first two fields of the calendar file 33. The succeeding three fields of calendar file 33 provide an indication of the integer number of machines, of the specifications in the corresponding record, available during the working shifts of a weekday. The last three fields of calendar file 33 indicate the integer number of those workstations available for each shift during weekend days.

In calendar exception file 35 (FIG. 1c), the user indicates exceptions to the usual number of workstations available as specified in calendar file 33. The calendar exception file 35 is accessed by workstation ID type and site as indicated in the first two fields of that file. The next field of calendar exception file 35 indicates a starting date of the exception. The next field indicates the end date of the exception. The last field indicates the number of workstations that are available during the exception period defined by the start date and end date.

Calendar file 33 and calendar exception file 35 are formed from data input by the user through screen views 37 (FIG. 3b) and 79 (FIG. 3i) respectively. Screen view 37 provides input fields which correspond to the fields of calendar file 33, and screen view 79 provides input fields which correspond to the fields of calendar exception file 35.

Coupled to the workstation parameter file 31 is a process workstation file 39 (FIG. 1c). The contents of file 39 specify the capacities which will be consumed on a workstation/machine as specified by the routing file 27 (FIG. 1b). There is only one entry in file 39 for each resource ID.site.cap code combination in the routing file 27. The cap code (Capacity code) is a key that identifies a specific consumption pattern (consumption rate of a process as a function of the particular resource/machine employed for that process). For each entry in the process workstation file 39, there is a description of the capacity code and indications of the amounts of time required to set up, clear and run the corresponding process on the involved machine with respect to a batch. Also indicated is the capacity, as a bulk amount or rate, that each slot of the corresponding machine can process while performing the process referenced by the cap code.

Also in memory area 19 (FIG. 1a), digital processor 15 provides a description of the staffing pool resources of the manufacturer. A staff pool file 43 (FIG. 1c) which lists all the staff pools available is formed through a staff pool list screen view 41 of FIG. 3c. For each staff pool group of the manufacturer, the user enters in respective fields of screen view 41 a staff pool identification name or number, the plant site of that staff pool and a description of the staff pool. Examples of the different groups of staff pools which may be listed in the screen view 41 are clerical staff, foremen, assembly line staff, etc.

Linked to the staff pool list 43 is a staff pool preference file 45 (FIG. 1c). Preference file 45 contains the staff pool preferences for a machine. There is a record in file 45 for every resource ID.site.cap code combination in the routing file 27 (FIG. 1b) that requires a staff pool. The contents of the records in the preference file 45 are formed from data input by the user into preference screen view 47 illustrated in FIG. 3d. The user enters into preference screen view 47 the machine or workstation type (from "ID" field of workstation list screen view 29, FIG. 3a), a capacity code and the plant/site of the corresponding machine to establish one record in the preference file 45. The contents of the formed record are established by the staff pool IDs inserted in the list of preferences in "preference number" field of screen view 47.

Another file associated with staff pool file 43 is the workstation staff pool usage file 49 illustrated in FIG.

1c. The records in this file 49 specify the capacities that will be consumed in staff pool usage for different processes on different machines. The records are arranged according to a machine/workstation type, the plant site of that machine, the corresponding capacity code for the machine and preference code of the preference file 45. Each record is established upon user completion of the workstation staff pool usage screen view 51 illustrated in FIG. 3e. Through the keyboard 11, the user inputs in the heading of screen view 51, the workstation type (machine ID from screen view 29 of FIG. 3a), capacity code, site and corresponding preference number. The completion of those fields establishes a record in the workstation staff usage file 49. The contents of that record are formed from the information the user inputs in the fields in the lower portion of screen view 51. The fields in the lower portion of screen view 51 include a staff pool ID, the time required of the staff pool to set up a machine of the type indicated in the screen view heading, the staff pool time required during running of the machine (preferably given as a percentage of the machine run time) and the time required of the staff pool to clear the machine.

Also for each staff pool listed in the staff pool list of screen view 41 and in file 43, there is an associated calendar file 53 (FIG. 1c) and calendar exception file 55 (FIG. 1c) similar to those of the workstation parameter file 31. The staff pool calendar file 53 is arranged by staff pool ID and site. For a staff pool group at a particular site, the calendar file 53 indicates the number of man hours available during the three shifts of a working day during the work week. The last three fields of calendar file 53 indicate the number of man hours available for the corresponding staff pool group during the three shifts of a weekend day.

Calendar exception file 55 (FIG. 1c) is indexed by staff pool ID and site. That is, for each staff pool of a particular group at a particular site, an entry in calendar exception file 55 indicates the exception in available man hours to that indicated in calendar file 53 for the particular staff pool group. To that end, calendar exception file 55 indicates a start date to the exception, an end date of the exception and the number of man hours available during the exception period defined by the start date and end date.

A staff pool calendar information screen view 57 (FIG. 3f) is displayed by the digital processor on display unit 13 for user input information to define calendar file 53. In particular, user input of a staff pool type (group) and a staff pool site (plant site of that staff pool group) establishes a calendar file 53 for that staff pool group at the indicated plant. Respective fields are provided in screen view 57 for the user to enter available man hours during the three working shifts of the weekdays as well as those of weekends.

In screen view 79 (FIG. 3i) described previously, fields are provided for user entry of the exceptions to the staff pool availability indicated in the calendar information screen view 57. The user entered information of screen view 57 establishes the calendar exception file 55 for the indicated staff pool group at the indicated plant site. In a preferred embodiment, the screen view 57 fields to accomplish this include a field for user input of a start date to the exception, an end date to the exception, and the number of man hours available during the exception period.

Also, in memory area 19 (FIG. 1a) are files for describing the materials available as resources for the manufacturer. An inventory file 59 (FIG. 1c) is formed through an inventory screen view 61 of FIG. 3g. The inventory file 59 contains inventory information for each day. The information includes an indication of an item, the plant site at which the item is located, and the amount of that item currently in inventory at the indicated site. This information is established by the user entering in screen view 61 for each item that the manufacturer inventories, a product number (as used in screen view 21 of FIG. 2a) in the "product number" field, a plant ID in the "site" field and a quantity in the "inventory level" field.

A safety stock file 63 (FIG. 1c) contains information on item safety stock desired by the manufacturer. There is at least one record in stock file 63 for each item designated M, B, I in the product list of screen view 21 (FIG. 2a). Each record in stock file 63 has an indication of the item, plant site associated with the item, a date that the safety stock level for that item is to change, and the quantity or level desired as of that date. This information is provided by the user through safety stock screen view 65 illustrated in FIG. 3h. In particular, screen view 65 provides fields for product number, site, date and quantity. The user completes these fields by entering the pertinent information through the keyboard 11.

According to the foregoing, the user completes the screen views illustrated in FIGS. 2a-3h to provide digital processor 15 the necessary information to form files which describe possible items of manufacture and files which describe the possible available resources. The former files form memory area 17 and the latter files form memory area 19 as illustrated in FIGS. 1a-1c.

Once these memory areas 17 and 19 have been determined, the user and digital processor 15 subsequently and over time define orders of items for which the manufacturer is responsible as illustrated at 81 in FIG. 5. It is these orders or a subset thereof which the main procedure 89 of the present invention program schedules (as described later). The orders include orders specified by user input as well as spawned orders which are internally generated by the main procedure 89 during scheduling of a user specified order. All such orders across the different manufacturing sites are indicated in order file 67 illustrated in FIG. 1a and in more detail in FIG. 1d.

Order file 67 (FIG. 1d) provides one record 99 for each order. The records 99 are indexed by a manufacturing order ID number and the plant associated with the order. Both the manufacturing order ID Number and the plant site indication are provided in the header of the order file record 99. The contents of an order file record 99 include the product number of the subject item and the plant site associated with that product number. Both the product number and the plant site correspond to an entry (record) in the product parameter file 25 (FIG. 1b). Also for the subject item, order file record 99 indicates the priority level of this order, the quantity to be manufactured by this order, and a date by which the order must be finished.

Each record 99 of order file 67 also provides fields to indicate the scheduled start date for manufacture for the corresponding order as assigned by the main procedure 89 and the scheduled end date for the order as assigned by the main procedure 89. There are also fields to indicate the actual start date of manufacture for the order and the actual end date of manufacture for the order. Also, a field in the record is provided to indicate the target date when the order will be completed as scheduled by the main procedure. A flag indicates whether the order is one specified by the user or one spawned from a user specified order. Also, an order type identifier is provided. The identifier in the preferred embodiment indicates 0 for a manufacturing order, 1 for a customer order, 2 for a purchase order, and 3 for a transfer.

In the case of a user specified order, the foregoing fields of an order file record 99 are completed by input data stored in a database. The input data is bulk loaded through a batch program, or alternatively is user input through order screen view 75 illustrated in FIG. 4. With screen view 75 displayed on display unit 13, the user enters through keyboard 11 the pertinent information for a desired order in the indicated fields. The information includes an order number such as a purchase order number; the product or item being ordered indicated by a name or ID number; a plant site responsible for the order; the type of order such as a manufacturing order, a customer order, a purchase order, or a transfer order; the desired quantity; and the required completion date of the order. Optionally, the user may enter a begin and end date for which manufacturing of the order is to begin and end respectively by override or by default if no other begin and end dates are scheduled for the order. To that end, the specified dates are the dates on which processing of the order actually occurs as opposed to the scheduled dates suggested by the main procedure 89 after execution thereof.

Figure 5:
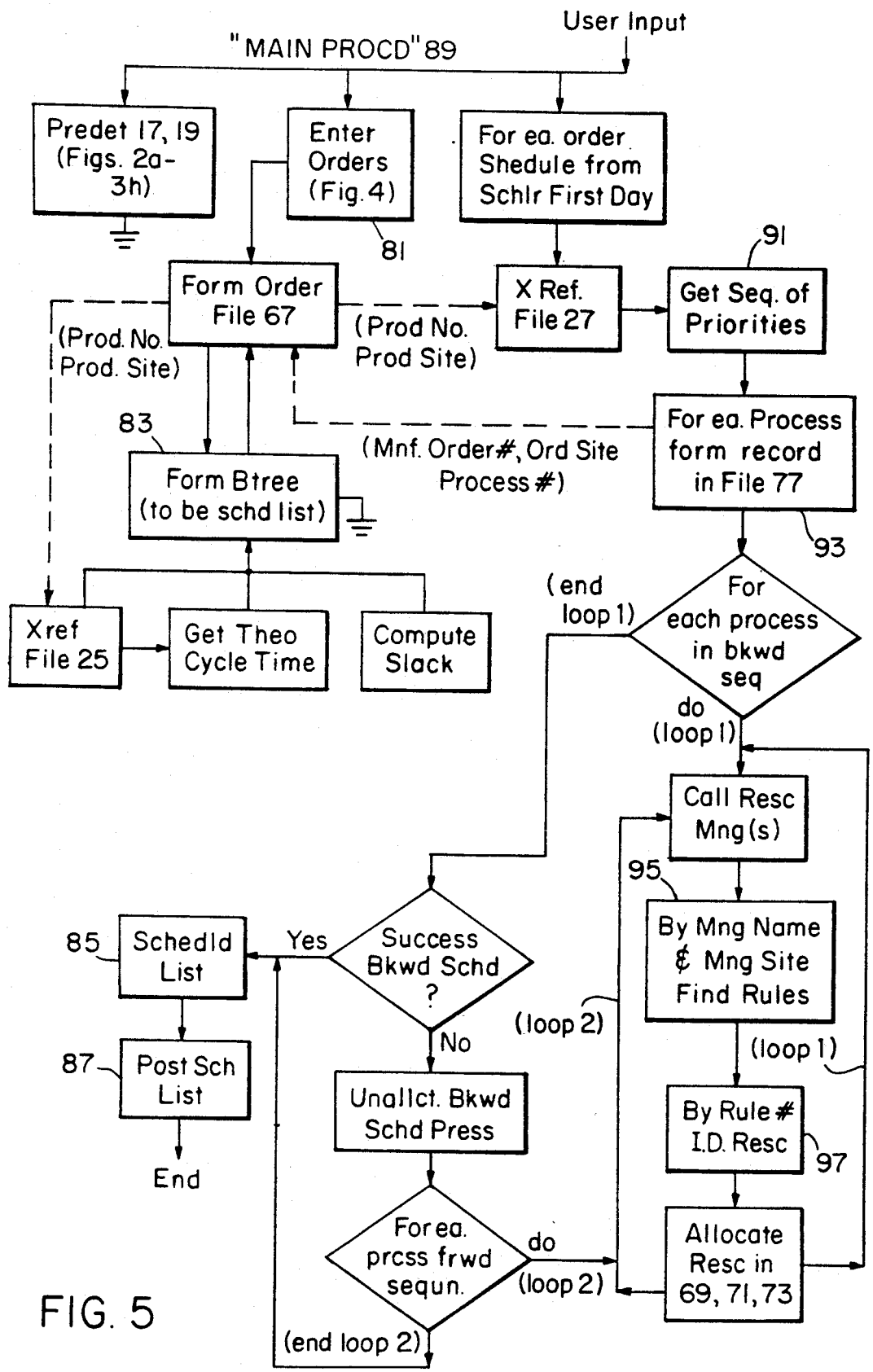

As illustrated at 83 in the flow diagram FIG. 5, the program of the present invention forms from order file 67 a list of user specified (original) orders to be scheduled (i.e. those orders whose actual begin and end date have not been passed). Preferably, the list of orders to be scheduled is maintained as a Btree in least "slack" sequence. Digital processor 15 calculates "slack" of an order while the corresponding record in order file 67 for the order is created. "Slack" of an order is defined as required completion date—(the First Day from which scheduling is to begin+the theoretical cycle time from the corresponding record in the product parameter file 25 for the item ordered).

Hence, "slack" of an order is the number of days between the current date or first day for scheduling purposes and the latest date that manufacturing of the order item must start in order to meet the required completion date. A negative slack value indicates the number of days into the past for which the order has been over due.

After the program of the present invention has arranged the Btree 83 of to-be-scheduled orders in least slack order, then the main procedure 89 (on user command) sequentially traverses the Btree and schedules each entry (order) in the Btree. During the scheduling of a user specified order, materials or other ingredients may be determined to be wanting as of a particular date. In order to satisfy the proper scheduling of the user specified order, the main procedure 89 places orders for the wanted materials. These orders are referred to as spawned orders. The main procedure 89 places the spawned order in a similar manner that the user specifies an "original" or parent order, i.e. by providing the pertinent item identification, site, quantity and date specification information to order file 67. Upon receipt of the spawned order from main procedure 89, digital processor 15 forms a record 99 for the spawned order in the order file 67 as described previously and illustrated in FIG. 1d.

Main procedure 89 inserts spawned orders of a parent/original order into the Btree list 83 as part of the parent entry but giving priority to the spawned orders. Hence, the computed slack for each order is constant but the hierarchy of entries (orders) on the Btree list 83 change according to additions and deletions from the Btree. Main procedure 89 immediately schedules the spawned orders before continuing to schedule the corresponding parent order.

As an order is scheduled, the order and all of its spawned orders are stored in a list of scheduled orders 85 (FIG. 5). If spawned orders are scheduled and unscheduled during the scheduling of the same top level (parent) order, the spawned orders are added and deleted from the list 85 of scheduled orders. When the top level order schedules successfully, all of these associated orders are transferred to a post schedule list 87 (FIG. 5) to wait for performance according to the rule that once manufacturing processes are started for an order they are to run to completion as soon as possible. Thus, all spawned orders of a parent order and the parent order itself are scheduled before the next original/parent order is looked at for scheduling by main procedure 89.

Specifically, the main procedure 89 of the invention program runs as follows as outlined in FIG. 5. Upon user input to digital processor 15 of the command to execute main procedure 89, the procedure 89 reads (in least slack order) from order file 67, the orders to be scheduled as listed in Btree 83. Beginning with the top entry in the Btree, the order with least slack, the main procedure 89 searches the routing file 27 (FIG. 1bb) by the product number and plant site of the item in the order, for the corresponding (product number site) record in the routing file 27. From the found corresponding record 27n, the main procedure 89 obtains the generic sequence of processes and plant site associated with each process for manufacturing the ordered item as illustrated at 91 in FIG. 5.

Figure 1D:
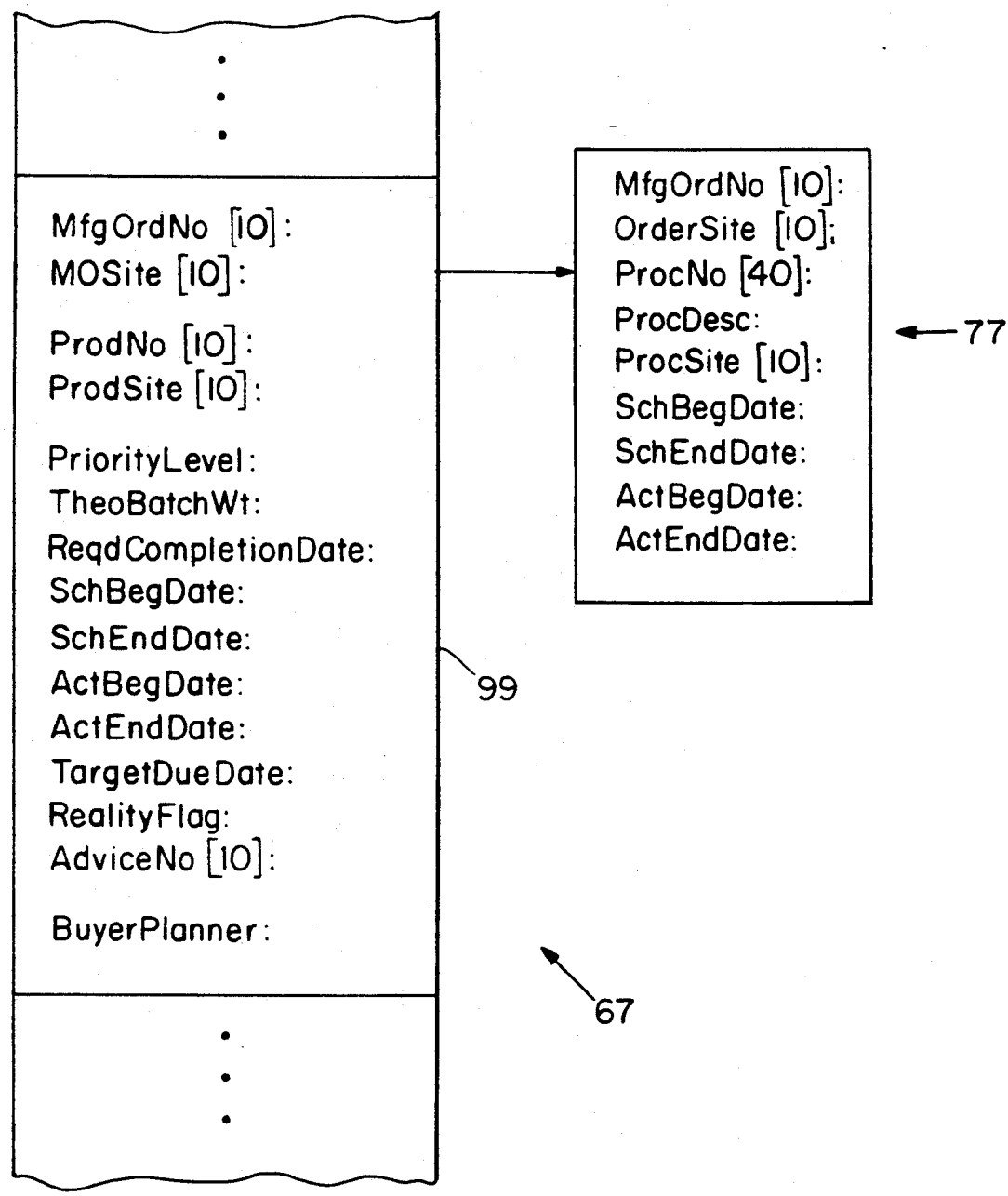

From the sequence of processes, for each process the main procedure 89 forms a record in a process file 77 illustrated in FIG. 1d. Each record of process file 77 specifies a process involved in the manufacturing of the item of the order currently being scheduled. To that end, a record in process file 77 has a header formed of the manufacturing order id number, the plant site associated with the manufacturing order and the process id number from the corresponding record 27n in routing file 27. The record in the process file 77 also contains an indication of the plant site in which the process is to be completed as indicated in the corresponding record 27n of routing file 27. Also in the record in the process file 77, a field for the schedule begin date and scheduled end date is provided and will be completed by the main procedure 89 when the process is finally scheduled. Actual begin date and actual end date fields in the record of process file 77 indicate start date and end date for the process when the manufacturer has actually begun and ended the process for that order.

Hence from the entry in order file 67 for the order being scheduled, main procedure 89 finds a corresponding record 27n in the routing file 27 (FIG. 1b) according to product number and product site indicated in the order file entry. From the routing file record 27n, main procedure 89 forms a series of records in process file 77, one for each process listed in the routing file record 27n, as indicated at 93 in FIG. 5. Main procedure 89 then backward-forward schedules the series of processes, for the ordered item, represented by the formed series of process records in process file 77 as follows.

To backward-forward schedule the series of processes, the main procedure 89 serially schedules in backward order the sequence of processes of an ordered item, from the specified required completion date of the order backward in time toward the first day for scheduling. For each process, main procedure 89 determines and calls a pertinent resource manager (described later) to match the needs of the process with available resources as indicated by allocation blocks 69, 71, 73 (FIG. 1a) in processor memory (described in detail later). The allocation blocks indicate amounts of each resource already scheduled for use in manufacturing other items. In particular, the resource manager of a process determines available dates and times of resources that satisfy the process. If the sequence of the processes of the order cannot be successfully serially backward scheduled between the required completion date and the user specified first day for scheduling, the determined available dates and times of resources to satisfy processes are released and the sequence of processes for the order is forward scheduled from the first day into the future. During forward scheduling, the resource managers determine available dates and times of resources to satisfy the processes.

More specifically, to ensure serial backwards scheduling of the sequence of processes of an order (i.e. scheduling the last process first then the next to last process etc.) from the required due date backward in time toward the first day for scheduling, the main procedure 89 sets the requested end time of the last process equal to the required completion date of the order. For any other process in the sequence of processes, the main procedure 89 sets the respective requested end time of the process equal to the scheduled begin time of the succeeding process.

If the processes of an order are being forward scheduled, then the main procedure 89 schedules the processes in sequence number order provided in the corresponding routing file record 27n (FIG. 1b). Hence for the first process, the main procedure 89 sets the requested start time equal to the specified first day for scheduling. For any other process, the main procedure 89 sets the respective requested start time equal to the scheduled end time of the previous process.

In serial backward order, beginning with the last process in the formed sequence of processes in process file 77 (FIG. 1d), for the order being scheduled, the main procedure 89 determines and calls a pertinent resource manager for the process. From a pre-established table cross referencing process numbers combined with process site to resource managers, the main procedure 89 determines the resource manager according to the process number and the process site of the corresponding process record in process file 77. Where a process employs more than one resource, main procedure 89 calls in parallel a different manager for each different resource for that process.

The called managers allocate respective resources in parallel. If the order is being backwards scheduled, the requested end date for each manager allocation is the process requested end date. If the order is being forward scheduled, the requested start date for each manager allocation is the process requested start date.

Hence, each manager of a particular process schedules its respective resources in parallel as to time and different managers for different processes of the ordered item schedule respective resources in series in backward order during backward scheduling and in sequence order during forward scheduling. Either direction of scheduling is done with regard to capacity of the involved resources.

Each manager of a process then makes a determination of how to satisfy the process where more than one resource is available for that process. As shown at 95 in FIG. 5 according to the manager name and plant site associated with that manager, a resource manager has a set of rules for determining which resources to use. The rules are organized according to a rule identification number. Associated with the rule identification number is a description of the rule and threshold (upper and lower limits) for which the rule is to apply. Also for each rule there is an indication of preference for using the rule. The preference is associated with a particular type of resource, for example the workstation type indicated in workstation file 31 (FIG. 1c) for a particular workstation. Also with the preference is indicated a capacity code for that type of resource. To that end, the preference provides minimization of waste of a resource. Also indicated is the number of days the user is willing to be early or late in order to use this preference.

Based on the rules the resource manager uniquely identifies a resource by its type, preference number and capacity code, as illustrated at 97 in FIG. 5. With these three identification factors the resource manager determines the particular resource to satisfy the subject process. From the record in the workstation parameter file 31 corresponding to the uniquely identified resource, the resource manager looks up the set up time for that resource, the run time for that resource, and the clear time for that resource. From these three time values, the manager determines the length of time for which the resource would be allocated to the process. Using the allocation blocks in memory of processor 15, the manager determines whether the resource to the process may be allocated for the determined length of time on the desired date/time being scheduled.

Figure 1E:
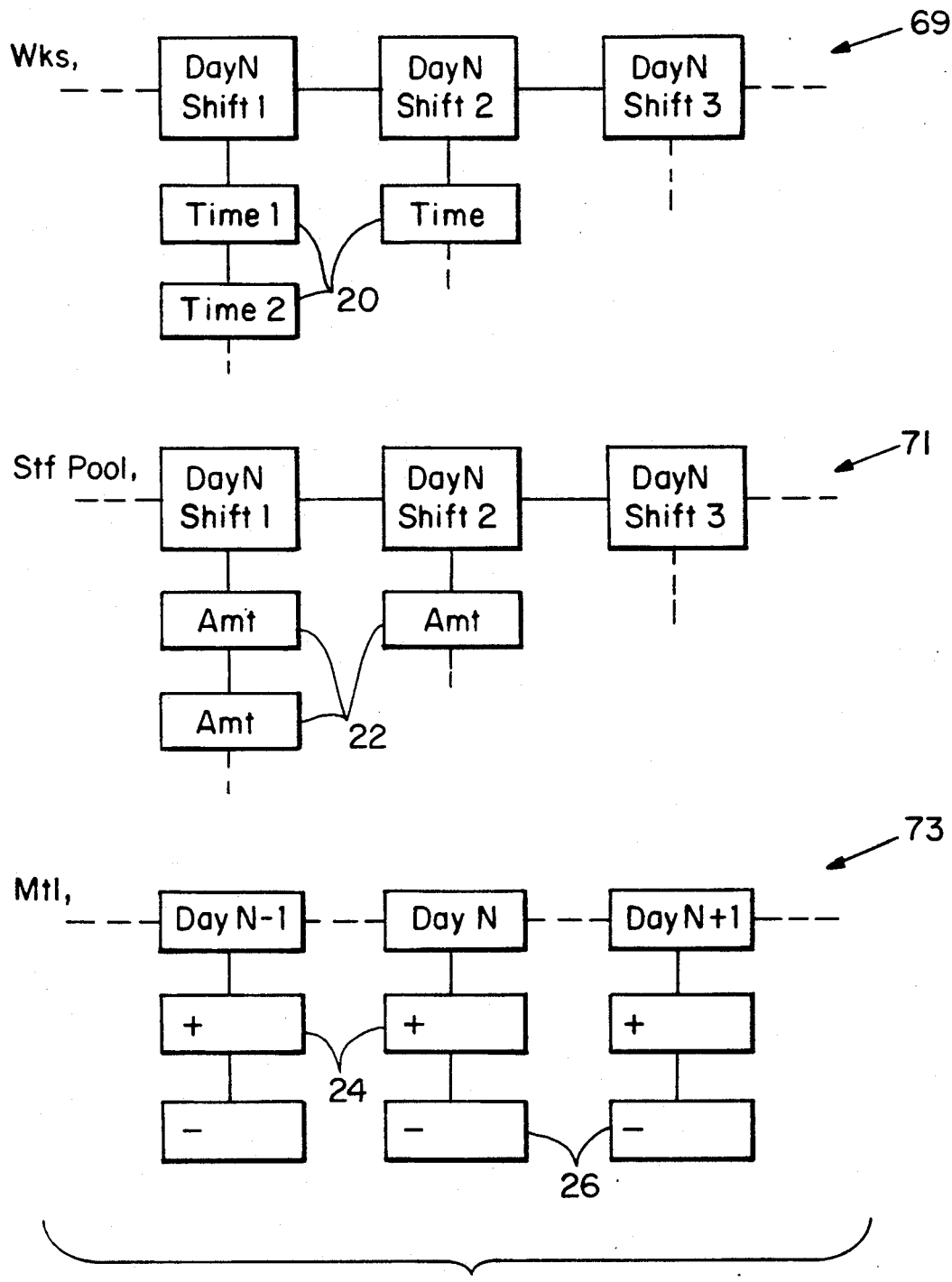

In the preferred embodiment, as illustrated in FIG. 1e for each resource there is an allocation block 69, 71 or 73. For a workstation/machine the resource allocation block 69 for each day indicates the three different shifts of that day. To allocate an amount of time of use of the workstation during a particular shift of a day, the resource manager creates an entry 20 under the desired shift. The entry 20 provides an indication of the particular block of time being allocated to the subject process. The entries 20 under each shift are maintained in chronological order for ease in searching availability of the workstation at desired dates and times.

Similarly allocation blocks for staff pool 71 (FIG. 1e) are arranged by days and for each day by shifts. For each shift, an entry 22 indicates the number of hours during the shift which are being allocated to a process. Only the total number of hours and not which particular hours in a shift are indicated by the entries as the present invention provides that a total number of staff pool man hours are available (in any arrangement) during each shift.

Allocation blocks 73 (FIG. 1e) for materials are arranged by days. Each allocation block 73 of a certain material has two entries 24, 26 established by a materials manager. Entry 24 of one day indicates the amount of the respective material that is being put into inventory on that day. Entry 26 of that day indicates the amount of the respective material that is being taken out of inventory for various processes. In addition, entries 24 and 26 of a day enable a net available amount of that day for the respective material to be readily computed. If materials are not available on a desired day, a manufacturing order or purchase order is generated for the materials and processed accordingly.

The manager checks each resource according to the foregoing steps until a resource which is best suited for the desired date/time in the backward-forward scheduling scheme is found. The manager allocates that resource to the process by forming the pertinent entry to the allocation block for the resource. If the manager is unable to find a resource available at the desired date/time, the manager determines the best possible time when a suitable resource is available and returns this information to main procedure 89.

After all processes of an order are scheduled the order is assigned a scheduled start time of the scheduled start time of the first process and a scheduled end time of the scheduled end time of the last process. That is main procedure 89 provides these values in the scheduled begin date and schedule end date fields of the record of the order in the order file 67. Also main procedure 89 places the order on the scheduled list 85 (FIG. 5) and subsequently on post schedule list 87 as previously described.

For purpose of further illustration and not limitation, the foregoing operations of resource managers is described next with reference to a preferred embodiment with three resource managers for three types of resources (materials, staff pool, and workstation/machines). A workstation manager selects a rule based on the batch size of the order. If a rule is not found for the batch size, the workstation manager returns to the main procedure 89 with an error flag. If a rule is found however, the manager loops through the preferences for that rule. For each preference the manager updates the capacity description and the capacity code for the preference. Then the workstation manager retrieves the workstation type defined by the workstation ID in the preference and tries to allocate the workstation/machine using the allocation block 69 (FIG. 1e) for the workstation. If the initial attempt to allocate fails (i.e., no available time is found during the desired shift) then the workstation manager proceeds to the next preference.

If the initial attempt to allocate succeeds (i.e. available time is found during the desired shift), the workstation manager verifies that the desired window of time can be allocated from the available times of the workstation. That is, if the main procedure is backward scheduling this process, the manager determines if the window begin time of the desired window of time is greater than or equal to the difference between the time of the workstation available begin time minus a backwards factor defined by the end time of workstation available time and end time of the desired window of time (i.e. beginning time of the succeeding process previously scheduled). If the main procedure was forward scheduling, then the workstation manager determines if the window begin time of the available workstation time is less than or equal to the begin time of the desired window of time plus a forward factor defined from the end time of the desired window and end time of the available workstation time.

If the attempt to allocate succeeded but the available workstation times did not fall in the acceptable desired range of times, then the workstation manager determines if the allocation is the best yet attained. If yes then the manager temporarily saves this preference, deallocates the resources obtained for this preference and goes to the next preference. After all preferences have been tried, if the manager has not found one that was acceptable, then the manager reschedules the saved preference as the best allocation possible. To that end, the present invention dynamically determines a workstation for the subject process.

After the workstation/machine has been scheduled by the workstation manager, the main procedure 89 checks for staff pool required to run the scheduled machine and ultimately schedules that staff pool. The main procedure 89 calls the staff pool manager which searches the staff pool preference file 45 (FIG. 1c) for a record corresponding to the workstation type given to the workstation manager from the main procedure 89. According to workstation type, the corresponding record in staff pool preference file 45 provides a capacity code. Using the capacity code, the staff pool manager searches the workstation staff pool usage file 49 to find a preference code. The record in the workstation staff pool usage file 49 indexed by the capacity code provides the associated preference code. From the preference code, the staff pool manager identifies the staff pool to use for the subject workstation and the amount of time for which the staff pool must be used. With the staff pool ID and the determined length of time, the staff pool manager looks to the staff pool allocation blocks 71 (FIG. 1e) for the desired staff pool. For the day and shift in question, if the staff pool block 71 indicates a remaining (available) time larger than or equal to the determined time of usage for that staff pool then the manager schedules the staff pool accordingly.

If the main procedure 89 is unable to schedule a staff pool after having scheduled a workstation/machine, then the main procedure 89 retries scheduling the workstation according to a time that the staff pool manager indicates that there is sufficient staff pool available for that workstation.

The materials manager is indexed by name and plant site. For each named manager, an alternate material manager is provided. Indexed by alternative manager identification is a list of material options. For each option, the list includes the material inventory name, plant site associated with the material, maximum percentage of material that plant site can contribute in order to satisfy the alternative and a minimum percentage. There is one materials manager for each material available as a resource in the manufacturing plant.

Main procedure 89 determines a materials manager according to process number and process site of the subject process. The determined materials manager searches the list of material options by material manager name, plant site of the manager and alternative identification number. As a result the materials manager uniquely identifies the material and percentage amounts of that material to satisfy the subject process. The materials manager then searches the material resource allocation block 73 (FIG. 1e) of the subject material for the desired date on which the material is to be allocated for use. Next the materials manager performs the following calculations. The manager sums all "daily net available amounts" from the current date up to the desired date on which the material is to be allocated for use. Each "daily net available amount" equals the amount of the material put into inventory that day minus the amount taken out of inventory that day. A second sum of the "daily net available amounts" from the day in question (i.e. the day on which the material is desired to be used) through all days scheduled into the future for that material is computed. The second sum is subtracted from the first sum to provide a resulting available quantity. If that resulting available quantity is greater than or equal to the quantity being requested for allocation then the materials manager schedules the amount being requested in the allocation block for the day in question.

The foregoing calculations insure that a net available amount of inventory for that material is maintained on any given day.

If the determined resulting available quantity is insufficient for the requested quantity, then the materials manager continues with other alternative materials listed in the list of material options. To that end the present invention dynamically determines a material for a subject process. If after all alternatives have been attempted and the material manager cannot schedule any materials to satisfy the process then the manager must place an order for the material. This order is satisfied by the main procedure 89 being recursively recalled to schedule the order before continuing to schedule the parent order which requires the material being ordered.

The spawned order is backward-forward scheduled and may recursively spawn other spawned orders for the resources that it requires. If the main procedure 89 fails to successfully backward schedule any parts of a spawned order, the main procedure 89 unschedules any scheduled parts of the spawned order. If the corresponding parent order was also being backward scheduled then the spawned order is deleted. The foregoing is recursively applied until there is either no parent order or a parent order that was being forward scheduled. When the main procedure 89 finds an order which has no parent or has a parent that was being forward scheduled, then the main procedure 89 forward schedules the order from the first day for scheduling.

After the main procedure 89 has completed scheduling all orders (parent and spawned) the allocation blocks 69, 71, 73 provide a indication of the various times and amount for which resources have been allocated. From the information held in these blocks various output maybe generated. In particular, an ordering plan may be generated for each order scheduled. The plan provides an indication of the processes involved to satisfy the order, the routing of the processes the types of resources used to satisfy each process, the start and end times of the resources used, the quantity of each resource used, and total elapsed time to satisfy the order.

Another output provided by the present invention from the allocation blocks 69, 71, 73 is a resource plan. For each resource, the output provides a list of the orders which require use of that resource, the processes which use the resource, and the start and finish times of each use of the resource. From this information the manufacturer knows when certain materials need to be ordered in order to enable the manufacturing processes to occur as scheduled. In particular for each raw material, a date indication and a quantity indication of the raw material is provided. The series of indications for each material are arranged in chronological order.

Also various statistics on usage and the cost of holding inventory may be determined from the information held in the allocation blocks 69, 71 and 73. In one embodiment of the present invention, a database holds program output regarding the utilization of resources of the manufacturing plant. This database reports, according to the scheduled manufacturing processes, the quantity of use that each resource is scheduled to have. Resources represented in this database include workstations, staff pool and materials. As for workstations, an indication on a daily basis of what each workstation is scheduled to do is indicated. Also, over a period of time a percentage usage of days available is indicated. As for the staff pool resource, each staff pool group's daily work load is indicated and from the daily work load indication percentage of work load over a period of time is calculated and provided. As for the materials, the database indicates inventory levels on a day-to-day basis as well as over a period of predetermined time. From this database, bottleneck situations can be determined where 100% utilization is indicated. To that end, a manufacturer is able to determine whether it is necessary to add shifts or more staff or more workstations in his plant.

It is understood that the output of the present invention program may be stored in various databases for user accessibility and may be printed through a printer connected to digital processor 15 by means common in the art. Other charting or graphs of the stored and output information are also possible as known in the art.

While the invention has been particularly shown and described with reference to a preferred embodiment thereof, it will be understood by those skilled in the art that various changes in form and details may be made therein without departing from the spirit and scope of the invention as defined by the appended claims.

For example, main procedure 89 may schedule a sequence of processes to manufacture an item by a backward-jump forward method. In that method, serial backward scheduling of the sequence of processes is attempted as described previously. If any process in the sequence cannot be scheduled between the first day for scheduling and the required completion date, the main procedure 89 determines the number of days previous to the first day for scheduling that the processes at issue are able to be scheduled. This is accomplished by a temporary serial backward scheduling of the sequence of processes without regard to the first day for scheduling but with regard to capacity of involved resources as described previously. Upon completion of the temporary serial backward scheduling, the resulting scheduled begin date for manufacturing the subject item is subtracted from the first day for scheduling. From the subtraction, a resulting number of days previous to the first day for scheduling is obtained and held as a delta value. Main procedure deletes the temporary backward scheduling and adds the delta value to the required completion date to form an adjusted completion date. Main procedure 89 then backward schedules from the adjusted completion date by the previously described method with resource managers, preference rules, etc. If resources still are not found, a new delta value is calculated and a new adjusted completion date is established in the manner described above, and main procedure 89 attempts backward scheduling again.

We claim:

1. A method for scheduling a desired sequence of events which is to be accomplished by a certain date, comprising the steps of:

for a given sequence of events each having a predeterminable length of time to accomplish and requiring predetermined amounts of resources, and for a given due date when all events in the given sequence must be accomplished, selecting one event at a time from the given sequence, in backward sequence order from a last event to a first event in the given sequence;

for each successive selected event, serially scheduling a working length of time for that event, the working length of time being equal to the respective length of time to accomplish the event during a length of time in which the respective resources are available in the predetermined amounts; the serial scheduling of working lengths of time for each successive selected event including serially scheduling the working lengths of time from the given due date backward in time toward but excluding a present date; and rescheduling the working lengths of time for the sequence of events if the serial scheduling of working lengths of time requires inclusion of the present date.

2. A method as claimed in claim 1, wherein said rescheduling includes scheduling the working lengths of time of the sequenced events from a day after the present date into future dates in a forward sequence order from the first event in the given sequence to the last event.

3. A method as claimed in claim 1 wherein said rescheduling includes:
a) determining an extra amount of time equal to a working amount of time from the present date backward in time to complete the sequence of events required by the serial scheduling, the working amount of time including the present date and past dates;
b) modifying the given due date by the determined extra amount of time to define a new due date; and
c) serially scheduling the working lengths of time from the new due date backward in time toward the present date.

4. A method as claimed in claim 1 wherein the step of serially scheduling an event includes:
scheduling purchase of certain resources required for the event; and
scheduling production of other resources required for the event,
said scheduling of purchases and production of resources enabling respective resources to be available in the predetermined amounts during the length of time in which the respective working length of time is scheduled.

5. A method as claimed in claim 1 wherein the step of serially scheduling an event includes:
determining availability of respective resources at particular times, including for certain resources stored in a predefined quantity, determining times when replenishment of the certain resources is required to maintain the predefined quantity but minimizes storage of quantities over the predefined quantity as a function of scheduled events which require the certain resources.

6. In a digital processor scheduling apparatus for scheduling a desired sequence of events which is to be accomplished by a certain date, the apparatus comprising:
memory means coupled to the digital processor for storing a user specified due date and a corresponding sequence of events to be accomplished by the due date, each event being accomplishable in a predeterminable length of time and requiring predetermined amounts of resources; and
a main computer routine performed by the digital processor for serially scheduling, from a last event to a first event in the stored sequence, working lengths of time which are equal to respective lengths of time of the events in the stored sequence, and which are times that the respective resources are available in the predetermined amounts, said serial scheduling beginning at the stored due date and proceeding backward in time toward but excluding the present date, said main computer routine further rescheduling working lengths of time for the sequence of events if the serial scheduling requires inclusion of a present date.

7. Scheduling apparatus as claimed in claim 6, wherein said main computer routine rescheduling includes scheduling the working lengths of time of the sequence of events from a day after the present date into future dates in a forward sequence order from the first event in the given sequence to the last event.

8. Scheduling apparatus as scheduled in claim 6, wherein the main computer routine reschedules working lengths of time for the sequence of events by
a) determining an extra amount of time equal to amount of time between and including the present date and a last scheduled date of the serial scheduling when the serial scheduling backward from the stored due date requires inclusion of the present date; or;
b) modifying the stored due date by the determined extra amount of time to define a new due date; and
c) serially scheduling the working lengths of time from the new date backward in time toward the present date.

9. Scheduling apparatus as claimed in claim 6 wherein the resources required by the events include materials, machinery and personnel.

10. Scheduling apparatus as claimed in claim 9 further comprising a counting procedure performed by the digital processor in conjunction with the main computer routine, the counting procedure for summing predetermined amounts of material needed to accomplish the events of the stored sequence, and for providing from the summing an indication of total amount of material needed by a certain date according to the scheduling of the events of the stored sequence by the main routine.

11. Scheduling apparatus as claimed in claim 9 further comprising a procedure for minimizing waste of materials and machinery, the procedure being performed by the digital processor in conjunction with the main computer routine.

12. Scheduling apparatus as claimed in claim 9 wherein:
materials are stored in respective predefined quantities; and
for each event, the main computer routine schedules a respective working length of time for the event by determining availability of required materials at particular times and by determining times when replenishment of the materials is required to maintain the predefined quantities but minimizes storage of quantities over the predefined quantities as a function of scheduled events which require the materials.

13. Scheduling apparatus as claimed in claim 6 wherein for each event, the main computer routine schedules a respective working length of time for the event by recursively scheduling respective required resources including (i) scheduling purchase of certain resources required for the event, and (ii) scheduling production of other resources required for the event, the recursive scheduling enabling respective resources to be available in the predetermined amounts during the respective working length of time.

14. Scheduling apparatus as claimed in claim 6 for scheduling a sequence of processes to manufacture a desired item, the scheduling apparatus comprising:
 a first memory data for storing descriptions of resources for accomplishing various processes; and
 a process routing performed by the digital processor for determining which resources described in the first memory area to use and for determining a date and time schedule of use of the determined resources to manufacture the desired item, the process routine determining resources and the date and time schedule of use according to a plurality of pre-established rules for selecting resources, the plurality of pre-established rules minimizing waiting time and waste of resources by placing a higher priority on items having the earliest due date, and each of the pre-established rules having a preference for use on particular resources such that waste of the particular resources is minimized.

15. Scheduling apparatus as claimed in claim 14 wherein:
 the first memory area stored descriptions include descriptions of materials, workstations and staff; and
 the rules of the process routine for selecting resources further include rules for selecting materials and workstations and rules for routing selected materials among the selected workstations.

* * * * *

UNITED STATES PATENT AND TRADEMARK OFFICE
CERTIFICATE OF CORRECTION

PATENT NO. : 5,233,533

DATED : August 3, 1993

INVENTOR(S) : Nils O. Edstrom, Stewart A. Davis, George B. Bennett, Ronald Vance Simmons, John B. Neal, John P. Long, Tom R. Kilber and Daniel R. Ries It is certified that error appears in the above-identified patent and that said Letters Patent is hereby corrected as shown below:

Col. 20, line 12, before "present" change "the" to read --a--.

Col. 20, line 15, before "present" change "a" to read --the--.

Signed and Sealed this

Twelfth Day of April, 1994

BRUCE LEHMAN

*Commissioner of Patents and Trademarks*

*Attest:*

*Attesting Officer*